(12) United States Patent
Rusinov et al.

(10) Patent No.: US 9,503,217 B1
(45) Date of Patent: Nov. 22, 2016

(54) SYSTEM AND METHOD FOR RELEASING MEDIA STREAMS FROM A COMMUNICATION SERVER

(75) Inventors: Igor Rusinov, San Jose, CA (US); Vlad Vendrow, Redwood Shores, CA (US); Benjamin Leznik, Atherton, CA (US)

(73) Assignee: RingCentral, Inc., Belmont, CA (US)

( * ) Notice: Subject to any disclaimer, the term of this patent is extended or adjusted under 35 U.S.C. 154(b) by 805 days.

(21) Appl. No.: 12/757,264

(22) Filed: Apr. 9, 2010

(51) Int. Cl.
*H04M 3/487* (2006.01)
*H04M 3/51* (2006.01)
*H04W 4/00* (2009.01)
*H04L 1/00* (2006.01)

(52) U.S. Cl.
CPC .................................. *H04L 1/0045* (2013.01)

(58) Field of Classification Search
CPC .......................... H04L 1/0045; H04L 65/1063
See application file for complete search history.

(56) References Cited

U.S. PATENT DOCUMENTS

| | | | |
|---|---|---|---|
| 6,404,746 B1 | 6/2002 | Cave et al. | |
| 7,369,535 B2 | 5/2008 | O'Brien, Jr. et al. | |
| 2001/0046237 A1* | 11/2001 | Chan et al. | 370/419 |
| 2002/0064149 A1* | 5/2002 | Elliott et al. | 370/352 |
| 2004/0028055 A1* | 2/2004 | Madour et al. | 370/395.21 |
| 2005/0074017 A1* | 4/2005 | Qian | H04M 3/2263 370/401 |
| 2006/0250994 A1* | 11/2006 | Sasaki | H04L 67/00 370/264 |
| 2007/0165636 A1* | 7/2007 | He et al. | 370/391 |
| 2007/0223401 A1* | 9/2007 | Chatterjee et al. | 370/261 |
| 2007/0280464 A1* | 12/2007 | Hughes et al. | 379/205.01 |
| 2008/0160987 A1* | 7/2008 | Wang et al. | 455/422.1 |
| 2008/0162713 A1* | 7/2008 | Bowra et al. | 709/231 |
| 2008/0205389 A1* | 8/2008 | Fang et al. | 370/389 |

* cited by examiner

*Primary Examiner* — Parth Patel
*Assistant Examiner* — Jason Harley
(74) *Attorney, Agent, or Firm* — Fish & Richardson P.C.

(57) ABSTRACT

A first call leg is established between a first communication device and a communication server having a telephony controller for controlling a hardware media processor. A second call leg is established between a second communication device and the communication server. The first and second call legs carry a media stream between the first and second communication devices, and the media stream is initially intended for processing by the hardware media processor. A suitable condition is needed to transfer the media stream to a release server. When the suitable condition is not detected, the media stream is processed with the hardware media processor. When the suitable condition is detected, the media stream is transferred to the release server. The release server lacks a hardware media processor.

17 Claims, 4 Drawing Sheets

SYSTEM AND METHOD FOR RELEASING MEDIA STREAMS FROM A COMMUNICATION SERVER

BACKGROUND

Hosted communications providers provide hosted voice, messaging, and data services to customers. These services are often provided through a packet-switched network such as the Internet. The hosted phone services are often referred to as Voice over Internet Protocol (VoIP) services since the voice communications are delivered over the Internet instead of over circuit-switched networks such as the public-switched telephone network (PSTN). Some of the popular features offered by hosted communications providers include media processing capabilities such as call recording or playback. Call recording is needed, for example, when recording general conversation. "Playback" refers to the playing of audio during a call, such as for a voicemail greeting, or in an interactive voice response menu, or in an auto-attendant setting.

Typically, media processing tasks such as call recording or playback are handled by telephony servers that have specialized hardware media processors (e.g. VoIP chips and/or chip sets) installed to perform the signal processing required by such tasks. The specialized hardware can also perform other tasks such as converting from one codec to another (known as "transcoding") when different codecs are used by communication devices in a particular call.

However, these specialized hardware resources can be expensive to purchase and maintain. Furthermore, the capacity of these specialized hardware resources to process calls can be a limiting factor in the call volume that can handled by a VoIP company.

SUMMARY

A system and method for releasing a media stream from a communication server to a release server is disclosed. In one embodiment, a first call leg is established between a first communication device and a communication server having a telephony controller for controlling a hardware media processor. A second call leg is established between a second communication device and the communication server. The first and second call legs carry a media stream between the first and second communication devices, and the media stream is initially intended for processing by the hardware media processor. A suitable condition must be present to transfer the media stream to a release server. When the suitable condition is not detected, the media stream is processed with the hardware media processor. When the suitable condition is detected, the media stream is transferred to the release server. The release server lacks a hardware media processor.

DESCRIPTION OF DRAWINGS

Like reference symbols in the various drawings indicate like elements.

DETAILED DESCRIPTION

Figure 1:
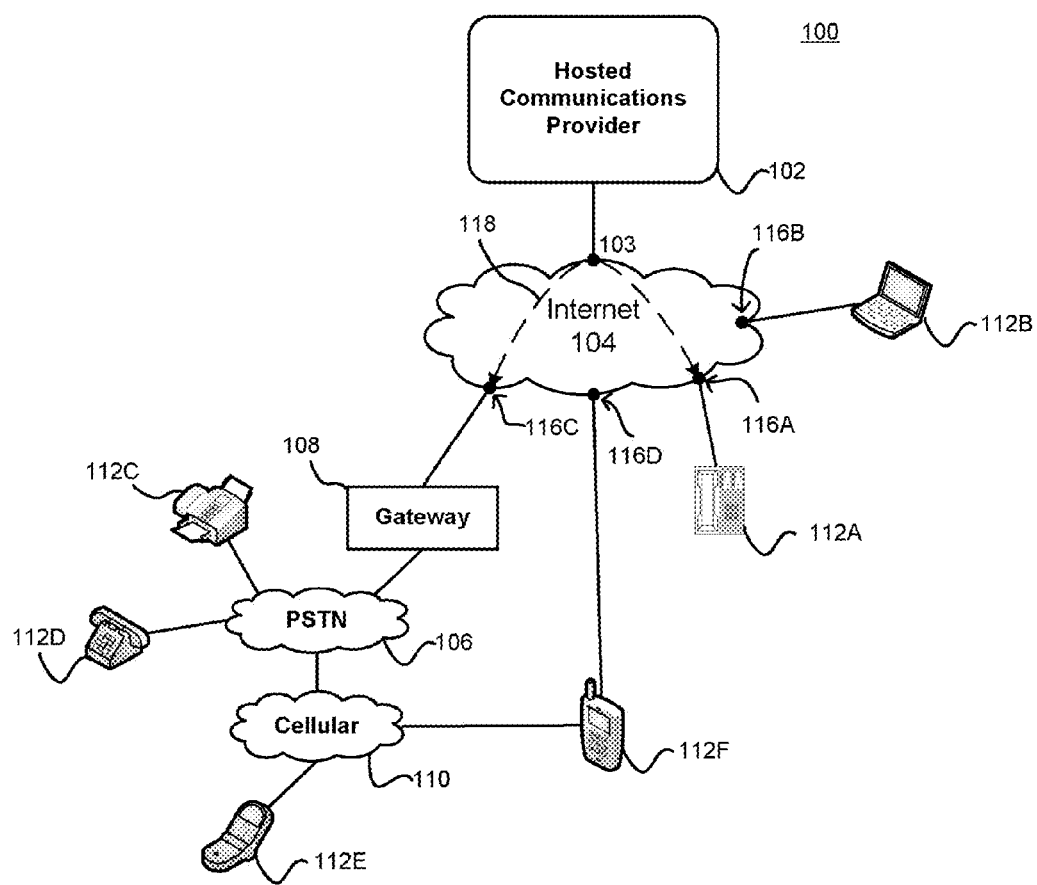
FIG. 1 is a block diagram of an exemplary telecommunications network 100 in which embodiments of the present invention may be practiced.

FIG. 1 is a high-level block diagram of an exemplary telecommunications network 100 in which embodiments of the present invention may be practiced. The telecommunications network includes a hosted communications provider 102, a packet-switched network (such as the Internet) 104, a public-switched telephone network (PSTN) 106, a PSTN-VoIP gateway 108, a cellular network 110, and communication devices 112A-112F. The communication devices 112 include a VoIP phone 112A, a computer 112B configured to run communications software applications (e.g. VoIP, voice, audio, video, or data applications), a fax machine 112C, a telephone 112D, a cellular phone 112E, and a multi-mode phone 112F.

The hosted communications provider 102 is connected to the Internet 122. Transmissions to and from the hosted communications provider 102 between the Internet 104 and the PSTN 106 pass through the PSTN-VoIP gateway 108. The PSTN 106 is also in communication with the cellular network 110.

The hosted communications provider 102 provides services to its customers via a connection 103 to the Internet 104. A customer of the hosted communications provider 102 can initiate or receive communications using any of the communication devices 112A-112F shown in FIG. 1. The VoIP phone 112A and the computer 112B can communicate using internet protocols; they communicate with the hosted communications provider 102 through the Internet 104. The fax machine 112C and the telephone 112D are connected to the PSTN 106; their communications with the hosted communications provider 102 pass through the PSTN-VoIP gateway 108. The PSTN-VoIP gateway 108 converts packets it receives from the Internet 104 into a format compatible for transmission across the PSTN 106, such as time-division multiplexing (TDM). The PSTN-VoIP gateway 108 also converts signals received from the PSTN 106 into IP packets for transmission over the Internet 104.

The cellular phone 112E is connected to the cellular network 110; it communicates with the hosted communications provider 102 via the cellular network 110 to the PSTN 106 to the PSTN-VoIP gateway 108. The multi-mode phone 112F can communicate with the hosted communications provider 102 via either the cellular network 110 or through its own connection to the Internet 104. The number and types of communication devices 112 shown in FIG. 1 are exemplary only and not exhaustive, and other configurations are possible. For example, a traditional analog telephone can be connected to the Internet 104 (instead of to the PSTN 106) by using an analog telephone adapter (ATA).

The hosted communications provider 102 provides VoIP and other media services through its Internet connection. There are various protocols used to send realtime multimedia (including voice and video communications) over the Internet. Session Initiation Protocol (SIP) is one protocol used to establish, transfer, and end sessions between communication devices across the Internet 104. The SIP signaling protocol is described further in Request For Comments (RFC) 3261 published by the Internet Engineering Task Force (IETF). Once a communication session has been established, Realtime Transport Protocol (RTP) is another protocol used to transport multimedia data packets across the Internet. The RTP protocol is described further in RFC 3550 published by the IETF. SIP and RTP are used herein as exemplary protocols for illustrative purposes only, but there are many other protocols that can be used in IP telephony including, but not limited to: the protocols defined by the International Telecommunication Union Telecommunication Standardization Sector (ITU-T) H.323 standard, and proprietary protocols such as those used by Skype™.

Suppose a customer of the hosted communications provider 102 wants to use one of the communication devices 112 shown in FIG. 1 to call any other one of the communication devices 112. For example, suppose the customer uses the VoIP phone 112A to make a call to the telephone 112D. (The callee at telephone 112D may or may not be another customer of the hosted communications provider 102. Furthermore, although not illustrated in FIG. 1, two devices of the same kind can be used to call each other as well). The customer initiates the call from the VoIP phone 112A, the call is received by the hosted communications provider 102, and the hosted communications provider 102 invites the telephone 112D to be a part of the call.

Since the telephone 112D is not directly connected to the Internet, a portion of the call travels over the Internet 104, and a portion of the call travels through the PSTN-VOIP gateway 108 and over the PSTN 106. The Internet portion of the call is conducted in packet-based protocols such as SIP or RTP—this portion of the communications path between VoIP phone 112A, the hosted communications provider 102, and the telephone 112D is identified as packet path 118 in FIG. 1. The points where the transmission and reception of packets start and end between two communications devices 112 are referred to herein as the endpoints 116 of a packet path (such as packet path 118). The stream of packets between the endpoints 116 is often referred to as a media stream. The endpoints 116 can typically be identified with a unique IP address.

The VoIP phone 112A connects to the Internet 104 at endpoint 116A. The computer 112B connects to the Internet 104 at endpoint 116B. The PSTN-VoIP gateway 108 connects to the Internet 104 at endpoint 116C. The multi-mode phone 112F connects to the Internet 104 at endpoint 116D.

Figure 2:
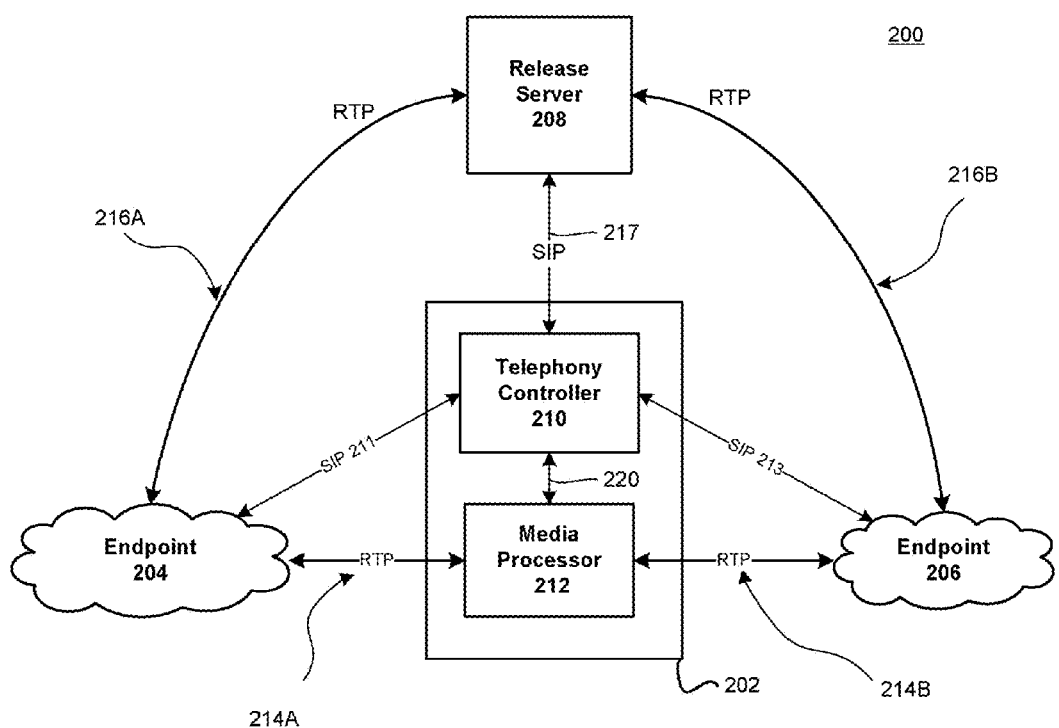
FIG. 2 is a block diagram of a system that may be used by a hosted communications provider to release a media stream from a telephony server to free up its hardware resources.

FIG. 2 is a block diagram of a system 200 that may be used by a hosted communications provider 102 to release a media stream from a telephony server 202 to free up its hardware media processors. The system 200 includes the telephony server 202, a first endpoint 204, a second endpoint 206, and the release server 208. The telephony server 202 includes a telephony controller 210 and hardware media processor 212. The telephony controller 210 controls and communicates with the hardware media processor 212 across control path 220 to set up call legs, transfer call legs, release call legs, and other call control tasks. The telephony controller 210 also controls and communicates with the release server 208 across control path 217. The system 200 as shown here in FIG. 2 is hosting a call session between two endpoints 204 and 206.

A call session is initiated when a first call leg 214A is established between the telephony server 202 and the first endpoint 204. To establish and control the call leg 214A, SIP messages are exchanged between the first endpoint 204 and the telephony controller 210 over a call control path SIP 211. Then, a second call leg 214B is established between the telephony server 202 and a second endpoint 206. To establish and control the call leg 214B, SIP messages are exchanged between the second endpoint 206 and the telephony controller 210 over a call control path SIP 213. The telephony controller 210 maintains control of the call session at all times—all SIP messages in the call session pass through or are generated by the telephony controller 210. It should be noted that other protocols may be used to establish and control calls, as previously described.

The first and second call legs 214A, 214B are connected through channels on the hardware media processor 212. Once the call session is established, the first and second endpoints 204, 206 exchange RTP packets carrying communications data. It should be noted that other protocols may be used to packetize and carry communications data, as previously described. The stream of RTP packets over the call legs 214A and 214B will be referred to collectively as media stream 214.

Only a single hardware media processor 212 is shown in the telephony server 202, but more than one hardware media processor 212 can be installed per telephony server 202. The hardware media processor 212 is a hardware product that the hosted communications provider 102 typically purchases from a third-party vendor. The media processor 212 can be a printed circuit board having a VoIP chip/chip set that is configured to process IP telephony packets. Typically the VoIP chip/chip set includes a digital signal processor. The media processor 212 has call recording and playback abilities. The media processor 212 also has the ability to transcode between the two call legs when the call legs use different codecs. Examples of a suitable media processor 212 include a media processing blade or card available from companies including, but not limited to, Audiocodes, Inc.; Dialogic Inc., Aculab, and RadiSys Corporation.

There are a limited number of channels available on the hardware media processor 212, which limits the number of calls that the hosted communications provider 102 can handle. To increase the system capacity and decrease service costs, the telephony server 202 releases the media stream 214 to the release server 208 when suitable conditions are detected, freeing up the channels in the hardware media processor 212 to handle additional calls.

The telephony controller 210, in communication with the media processor 212, must determine that the call session meets certain criteria before the media stream 214 can be released to release server 208. First, the telephony controller 210 determines if playback features are needed by the call session. When playback features have been requested or are still in use, the media stream 214 cannot be released because the media processor 212 is still needed to play back audio in the call session. Second, the telephony controller 210 determines if call recording features are needed by the call session. When call recording has been requested or is still recording in a conversation between caller and callee, the media stream 214 cannot be released since the hardware media processor 212 is required to perform the call recording functions. In one embodiment, if support for fax is desired, the telephony controller 210 also would have an in-band tone detection feature to check for a fax tone. If a fax tone is present, then the media stream 214 should also remain with the media processor 212 to handle a fax transmission/reception.

Finally, the telephony controller 210 compares the codecs used by the two call legs 214A and 214B. When the two call legs 214A and 214B use different codecs, the media stream 214 cannot be released since the media processor 212 is still needed to transcode between the different codecs.

However, when the telephony controller 210 determines that: (1) playback is not needed in the call session; (2) call recording is not needed in the call session; (3) when fax transmission or reception is supported, that a fax tone is not present; and (4) the codecs used by the two call legs are the same, then a suitable condition exists for the telephony controller 210 to release the media stream 214 from the media processor 212 to the release server 208.

To release the media stream 214, the telephony controller 210 first checks whether the release server 208 has the capacity to handle media stream 214. If the release server 208 has no capacity, it informs the telephony controller 210 and the media stream 214 is not released. If the release server 208 has the capacity, the telephony controller 210 transfers call leg 214A from the media processor 212 to the release server 208, shown as call leg 216A in FIG. 2. Strictly speaking, call leg 216A is the same call leg as 214A, since call legs are defined by signaling and not by the path of the media stream, but for the sake of clarity are identified with different reference numbers in this document and in the figures. The telephony controller 210 also transfers call leg 214B from the media processor 212 to the release server 208, shown as call leg 216B in FIG. 2. The stream of RTP packets over the transferred call legs 216A and 216B will be referred to collectively as media stream 216. Since the telephony controller 210 already determined that the two call legs 216A and 216B are using the same codecs, the release server 208 can transmit the RTP packets through from one call leg to the other with no transcoding required.

In one embodiment, the release server 208 checks each RTP packet in the media stream 216 to determine if it carries a dual-tone multi-frequency (DTMF) tone. When the release server 208 does not detect a DTMF tone, the packet is transmitted through to the other call leg unchanged.

When the release server 208 does detect a DTMF tone, it notifies the telephony controller 210 about the kind of DTMF tone received. The telephony controller 210 determines whether the tone is actionable or not. For example, some DTMF tones have no meaning and can simply be ignored, such as when random buttons on a keypad are accidently pushed.

But, some DTMF tones or sequences may be a request from a call session participant for a functionality that must be performed by the media processor 212. For example, suppose one of the participants in the call session of FIG. 2 decides to start recording midway through a conversation. The participant dials a series of tones on a keypad of a communication device (e.g. the buttons "*9") to initiate call recording. When the media stream 216 is being processed at the release server 208, the release server 208 lacks the media processing capabilities and cannot perform the call recording requested by the participant.

Therefore, if the release server 208 detects a DTMF tone that represents a functionality of the media processor 212 that the release server 208 lacks (e.g. playback or call recording), then the media stream 216 needs to be transferred back to the telephony server 202. Since the telephony controller 210 retains call control of the session at all times, it can transfer the media stream 216 back to the telephony server 202 and its media processor 212. This exchange of the RTP media stream between the telephony server 202 and the release server 208 can be repeated until the call session ends.

In one embodiment, the release server 208 deletes any packet that contains a DTMF tone and does not pass the packet through to the next call leg. In another embodiment, the release server 208 passes any packet containing a DTMF tone through to the next call leg without any changes.

The release server 208 can be implemented on a network-capable computer running a suitable operating system (e.g. Linux, Unix, Windows, etc.). Any suitable programming language and SIP/RTP implementation may be used. In an actual reduction to practice, C++ in combination with reSIProcate and SipXMedia components are used to build the release server 208 on a Linux platform. The release server 208 does not have a specialized hardware media processor such as a digital signal processor. Instead, the media stream 216 is processed using just the general central processing unit of the computer upon which the release server 208 is programmed.

Figure 3:
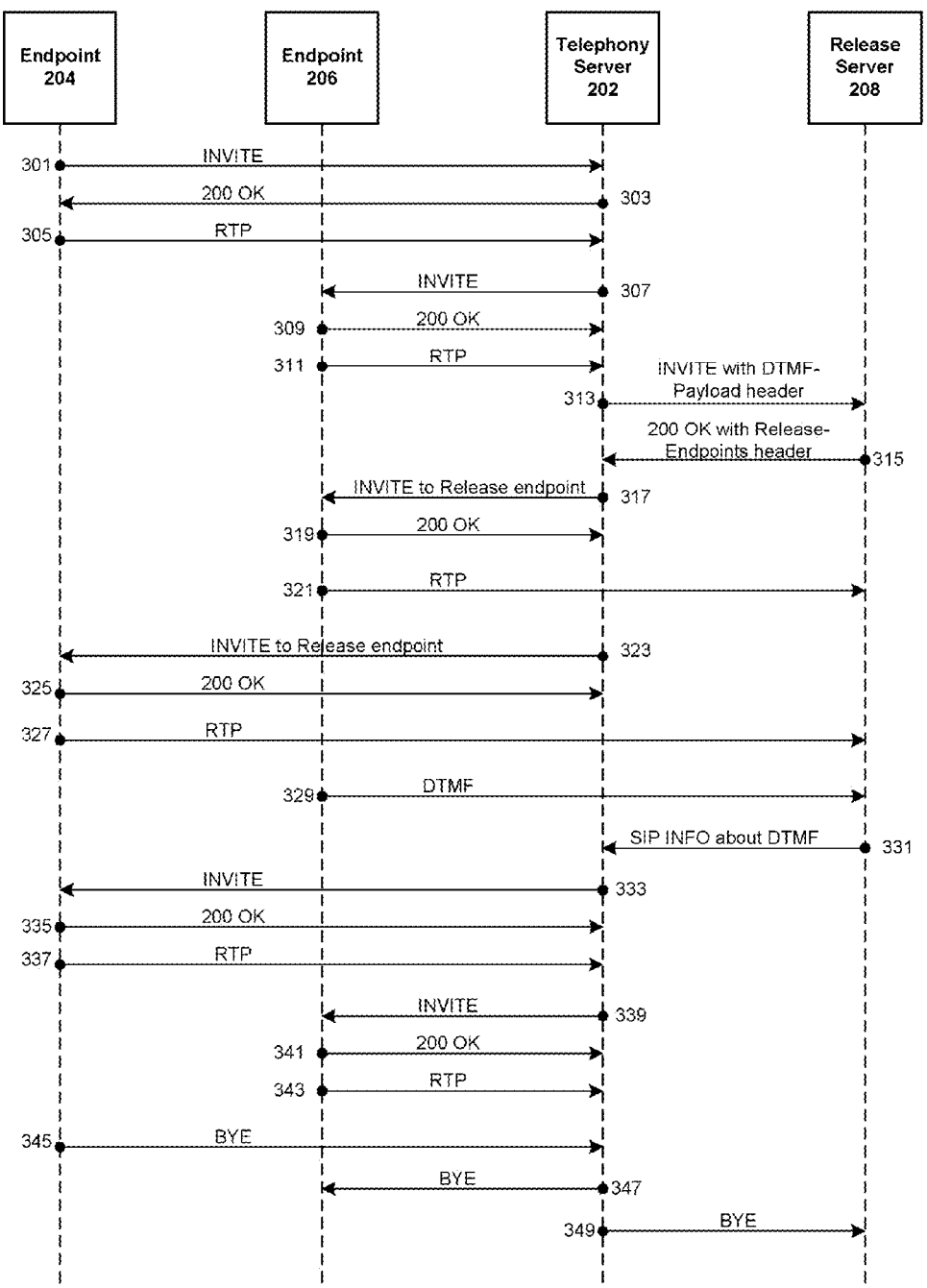
FIG. 3 is a call flow diagram that illustrates the steps involved in releasing a media stream from a telephony server to a release server.

FIG. 3 is a call flow diagram that illustrates the steps involved in releasing a media stream 214 from the telephony server 202 to the release server 208. It should be noted that FIG. 3 is only a high-level description of the key steps involved in releasing the media stream 214. Other steps besides those shown here are involved in a typical call session, but have been omitted to keep the diagram clear and concise. Furthermore, the order of the steps in the flow can be changed to accomplish the same result. It should also be noted that this call flow diagram describes just one possible implementation. Other protocols (not just SIP) and other communication flows can be used to achieve the same result.

First, in step 301, endpoint 204 sends a request to the telephony server 202 to initiate a call session with endpoint 206. This call session initiation request can be sent using SIP signaling protocol, in the form of a SIP INVITE request. This INVITE request contains call session information, such as the means of communication (audio, video, etc.), the codec types that can be used, and the addresses at the endpoint 204 for receiving media. In step 303, the telephony server 202 acknowledges the request with a SIP response code of 200 OK. In step 305, the endpoint 204 begins transmitting its message signals in an RTP stream to the telephony server 202. This sequence establishes the first call leg 214A in FIG. 2. For the purposes of the present invention, it does not matter whether the telephony server 202, the first endpoint 204, or the second endpoint 206 initiates the call session or establishes the first call leg.

Next, in step 307, the telephony server 202 sends a SIP INVITE request to endpoint 206. In step 309, the endpoint 206 acknowledges the request with a SIP response code of 200 OK. The response in step 309 includes the codec being used by the endpoint 206 for this call session. This allows the telephony controller 210 to determine if endpoints 204 and 206 are using the same codec for transmission. In step 311, the endpoint 206 begins transmitting its message signals in an RTP stream to the telephony server 202. This sequence establishes the second call leg 214B in FIG. 2.

Next in step 313, the telephony server 202 sends an invite request to the release server 208 to initiate the release of the media stream 214. This SIP INVITE includes a custom header which is identified as "DTMF-Payload" in the figure, although the name of the header is not important. The custom header "DTMF-Payload" is designed to provide information on the port addresses of the endpoints 204 and 206 to which the release server 208 will be connecting. The custom header "DTMF-Payload" should also indicate what the release server 208 should do when a DTMF tone is detected in the RTP stream. As previously described, the release server 208 can delete the DTMF tones, or pass them through to the next call leg. In step 315, the release server 208 responds with a SIP response code of 200 OK if it has resources to accept the media stream 214. This response includes a custom header which is identified as "Release-Endpoints". Again, the name of the custom header is not important. The "Release-Endpoints" header is designed to provide the port addresses of the release server 208 where the call legs can be accepted.

Next in step 317, the telephony server 202 sends an INVITE to endpoint 206. The INVITE includes one of the port addresses received in the custom header "Release-Endpoints" from the release server 208. The INVITE also instructs the endpoint 206 to send its RTP packets to the new port address of the release server 208. In step 319, the endpoint 206 acknowledges the INVITE and instruction with a 200 OK response. In step 321, the endpoint 206 stops sending its RTP packets to the telephony server 210 and sends its RTP packets to the release server 208 instead. This step establishes the call leg 216B of FIG. 2.

Next in step 323, the telephony server 202 sends an INVITE to endpoint 206, with the other port address received in the custom header "Release-Endpoints" from the release server 208. This INVITE instructs the endpoint 204 to send its RTP packets to the other new port address of the release server 208. In step 325, the endpoint 204 acknowledges the INVITE and instruction with a 200 OK response. In step 327, the endpoint 204 stops sending its RTP packets to the telephony server 202 and sends its RTP packets to the release server 208 instead. This step establishes the call leg 216A of FIG. 2. At this point, the media stream 214 is released from the telephony server 202 and transferred over to the release server 208 as media stream 216.

Next in step 329, a DTMF tone is generated at endpoint 206, and the endpoint 206 sends a DTMF signal to the release server 208. (DTMF tone could also be generated at endpoint 204). In step 331, the release server 208 sends a SIP INFO message to the telephony server 202 that a DTMF tone was received at endpoint 206. The SIP INFO message contains information as to which DTMF tone(s) were generated, and the endpoint that generated it.

When the DTMF tone is not actionable, the media stream 216 can remain with the release server 208. However, when the DTMF tone is an actionable tone that requires the use of the hardware media processor 212, then the media stream 216 needs to be transferred back to the telephony server 202.

Steps 333-343 illustrate the transfer of the media stream 216 back to the telephony server 202. In step 333, the telephony server 202 sends an INVITE request to endpoint 204. In step 335, endpoint 204 acknowledges the INVITE with a 200 OK response. In step 337, endpoint 204 sends its RTP stream to the telephony server 202. This reestablishes call leg 214A between endpoint 204 and the telephony server 202.

Next in step 339, the telephony server 202 sends an INVITE request to endpoint 206. In step 341, endpoint 206 acknowledges the INVITE with a 200 OK response. In step 343, endpoint 206 sends its RTP stream to the telephony server 202. This reestablishes call leg 214B between the endpoint 206 and the telephony server 202. At this point, the media stream has been transferred back to the telephony server 202 (and its hardware media processor 212) and the action requested by the DTMF tone generated in step 329 can be carried out. Once the DTMF tone action has been carried out, the media stream can be transferred back to the release server 208 using the sequence of steps previously described.

To conclude the call session, in step 345, the endpoint 204 terminates the call and sends a BYE signal to the telephony server 210. In step 347, the telephony server 202 sends a BYE signal to the endpoint 206. In step 349, the telephony server 202 sends a BYE signal to the release server 208 as well.

Figure 4:
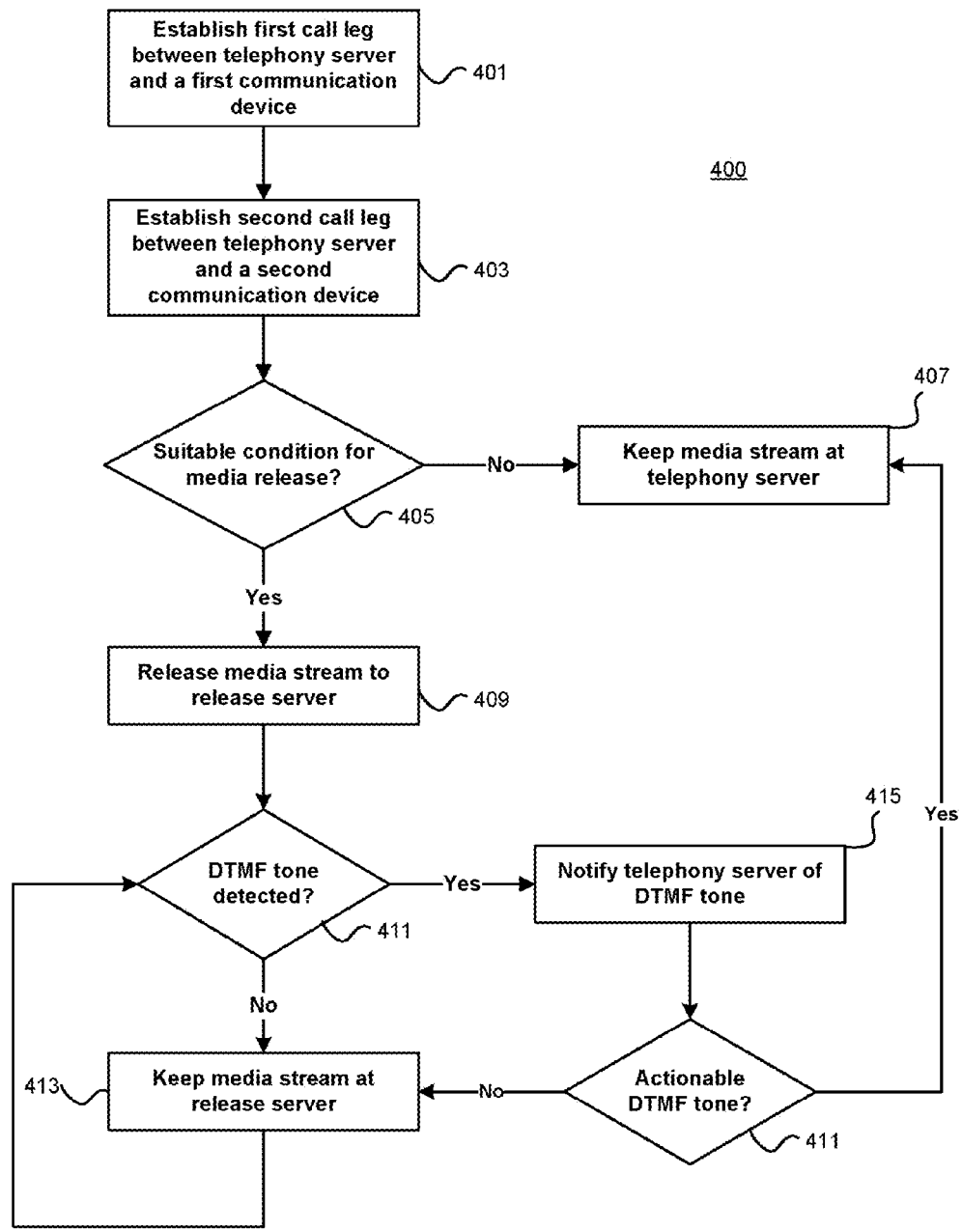
FIG. 4 is a flow chart of a method for releasing a media stream from a telephony server to a release server.

FIG. 4 shows a flowchart illustrating a method 400 for releasing a media stream from a telephony server 202 to a release server 208. In step 401, a first call leg is established between a first communication device 116 and the telephony server 202. In step 403, a second call leg is established between a second communication device 116 and the telephony server 202. Next, in step 405, the telephony controller 210 determines whether a suitable condition exists to release the media stream 214 from the telephony server 202. As described earlier, a suitable condition exists when playback is not needed in the call session, when call recording is not needed in the call session, and when the two call legs 214A & 214B are using the same codecs. When a suitable condition does not exist as shown in step 407, the telephony server 202 keeps the media stream 214. When a suitable condition does exist, the media stream 214 is released to the release server 208 as shown in step 409. In step 411, the release server 208 determines if a DTMF tone is detected in any of the packets of the media stream 216. When no DTMF tone is detected, the release server 208 keeps the media stream 216 as shown in step 413.

When a DTMF tone is detected, the release server 208 notifies the telephony server 202 as shown in step 415. In step 411, the telephony controller 210 determines if the DTMF tone is actionable, e.g. whether the hardware media processor 212 is needed. If the DTMF tone is not actionable, the release server 208 keeps the media stream 216 as shown in the return to step 413. If the DTMF tone is actionable, then the media stream is transferred back to the telephony server 202, as shown in the return back to step 407.

Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A method, comprising:
   establishing a first call leg between a first communication device and a communication server having a telephony controller for controlling a hardware media processor;
   establishing a second call leg between a second communication device and the communication server, the first and second call legs for carrying a media stream between the first and second communication devices, the media stream initially intended for processing by the hardware media processor;
   determining that processing the media stream initially does not require use of the hardware media processor;
   transferring the media stream from the communication server to a release server for processing based at least in part on determining that processing the media stream initially does not require use of the hardware media;
   while the media stream is being processed by the release server, determining that processing the media stream now requires use of the hardware media processor, comprising detecting a signal that represents a functionality of the hardware media processor that the release server lacks; and
   in response to determining that processing the media stream now requires use of the hardware media processor, transferring the media stream from the release server back to the communication server.

2. The method of claim 1, further comprising:
   determining that playback is not needed at either the first or second communication device, wherein transferring the media stream to the release server comprises:
   transferring the media stream to the release server based in part on determining that playback is not needed at either the first or second communication device.

3. The method of claim 1, further comprising:
determining that call recording is not needed at either the first or second communication device, wherein transferring the media stream to the release server comprises:
transferring the media stream to the release server based in part on determining that call recording is not needed at either the first or second communication device.

4. The method of claim 1, further comprising:
determining that a fax tone is not present in the media stream, wherein transferring the media stream to the release server comprises:
transferring the media stream to the release server based in part on determining that the fax tone is not present in the media stream.

5. The method of claim 1, further comprising:
detecting at the release server a dual-tone multi-frequency (DTMF) signal transmitted by the first or second communication device; and
notifying the telephony controller that a DTMF signal has been detected.

6. The method of claim 5, wherein the signal that represents a functionality of the hardware media processor that the release server lacks is a DTMF signal that requests a function performed by the hardware media processor that is not provided by the release server.

7. The method of claim 5, further comprising:
erasing the DTMF signal from the media stream when it has been detected.

8. The method of claim 1, wherein the media stream complies with Real-Time Transport Protocol (RTP).

9. The method of claim 1, wherein the hardware media processor comprises a digital signal processor designed for processing Voice over Internet Protocol (VoIP) signals.

10. A system, comprising:
a communication server comprising a telephony controller controlling a hardware media processor for processing a media stream exchanged between a first communication device and a second communication device; and
a release server that lacks a hardware media processor;
wherein the telephony controller is configured to:
determining that processing the media stream initially does not require use of the hardware media processor; and
release the media stream from the communication server to the release server based at least in part on determining that processing the media stream initially does not require use of the hardware media processor; and
wherein the release server is configured to:
while processing the media stream, determine that processing the media stream now requires use of the hardware media processor, comprising detecting a signal that represents a functionality of the hardware media processor that the release server lacks; and
in response to determining that processing the media stream now requires use of the hardware media processor, transfer the media stream back to the communication server.

11. The system of claim 10, wherein the telephony controller is configured to determine that call recording is not needed by either the first or second communication device and release the media stream from the communication server to the release server based in part on determining that call recording is not needed by either the first or second communication device.

12. The system of claim 10, wherein the telephony controller is configured to determine that playback is not needed at either the first or second communication device and release the media stream from the communication server to the release server based in part on determining that playback is not needed at either the first or second communication device.

13. The system of claim 10, wherein the release server is further configured to detect DTMF tones.

14. The system of claim 13, wherein the signal is an actionable DTMF tone.

15. A method, comprising
processing a media stream between a first and a second communication device at a communications server having a digital signal processor designed to process voice over internet protocol (VoIP) data; determining that processing the media stream initially does not require use of the hardware media processor; in response to determining that processing the media stream initially does not require use of the digital signal processor releasing the media stream to a release server;
processing the released media stream at the release server with a general central processing unit wherein the release server lacks a digital signal processor;
after the released media stream has been released to the release server, determining that processing the released media stream now requires use of the digital signal processor, comprising detecting a signal that represents a functionality of the hardware media processor that the release server lacks; and
in response to determining that processing the released media stream now requires use of the digital signal processor, transferring the release media stream back to the communications server that has the digital signal processor.

16. The method of claim 15, wherein the signal is an actionable DTMF tone in the released media stream.

17. The method of claim 15, wherein the released media stream carries RTP packets, further comprising:
checking an RTP packet in the released media stream for an actionable DTMF tone; and
passing the RTP packet between the first and second communication devices unchanged when an actionable DTMF tone is not detected.

* * * * *